May 29, 1962 A. B. ALBRECHT 3,036,361

TOOL

Filed May 15, 1958

*INVENTOR.*
ALBERT B. ALBRECHT
BY

AGENT

United States Patent Office 3,036,361
Patented May 29, 1962

3,036,361
TOOL
Albert B. Albrecht, Sidney, Ohio, assignor to The Monarch Machine Tool Company, Sidney, Ohio, a corporation of Ohio
Filed May 15, 1958, Ser. No. 735,463
1 Claim. (Cl. 29—96)

This invention relates to improvements in the art of tool holders and particularly the type in which an extremely hard cutting element, made of carbide, ceramic or other suitable material is inserted in and mechanically clamped in the tool holder. Former clamped insert type tools did not provide sufficient clamping with the result that when cutting forces that acted in a direction to withdraw the inserted tool as during a facing cut, the inserted tool would be pulled from its holder with consequent irregular machining and tool breakage. Furthermore, former types of inserted tools were not provided with close fitting recesses for the insert, with the result that forces applied to different sides of the insert would shift the insert.

Accordingly, it is an object of this invention to provide superior clamping means for inserted type tools.

It is another object to provide a clamping means for inserted type tools which precludes motion of the insert with respect to the tool holder.

It is another object to provide a clamping means for inserted type tools that works on the side rather than the top of the tool insert.

It is another object to provide a convenient, economic holder permitting rapid replacement of inserted cutting elements.

It is another object to provide cutting tool clamping means which locates the clamped insert in uniform position for ready and accurate interchange of inserts.

Figure 1:
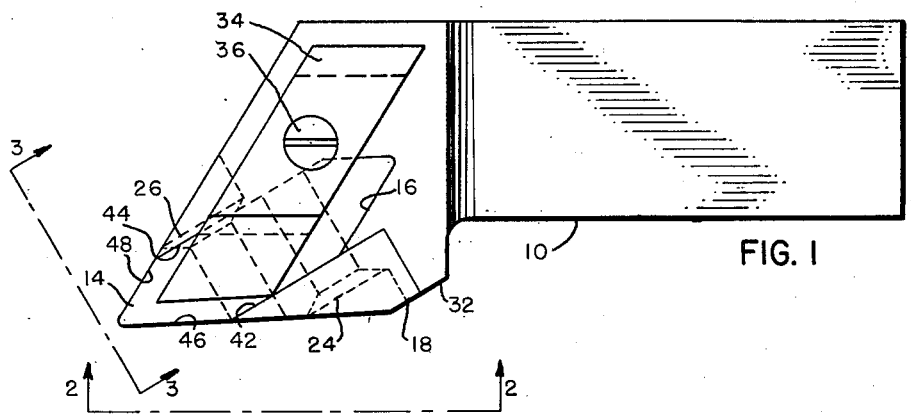
Figure 2:
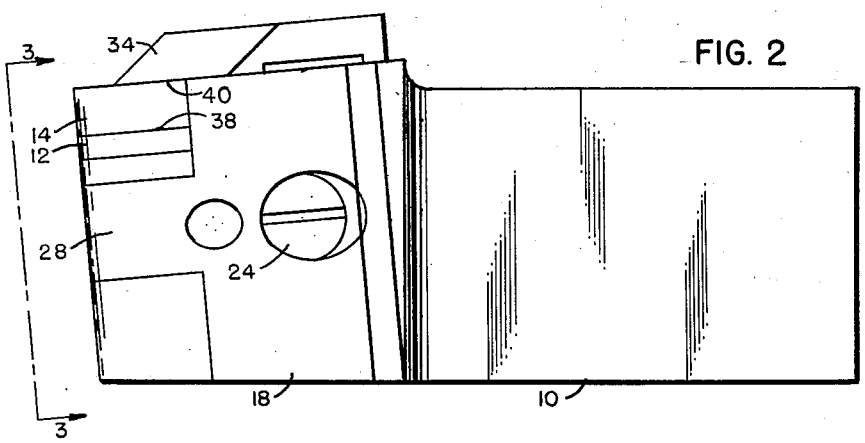
Figure 3:
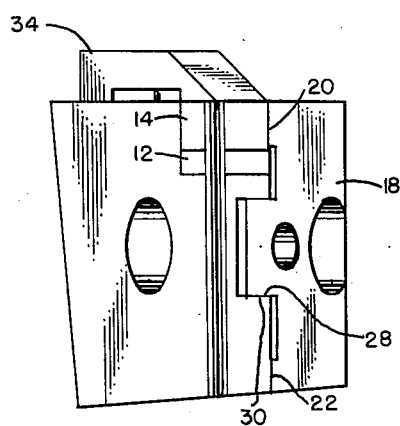

Other objects and advantages of this invention will be observed from the specification and the attached drawings in which:

FIGURE 1 is a plan view of a tool holder incorporated in the instant invention,

FIGURE 2 is a side elevation of the tool holder as seen from the line 2—2 of FIGURE 1, and FIGURE 3 is a front elevation of the tool holder as seen from the lines 3—3 of FIGURES 1 and 2.

Referring now to the drawings, the tool holder is shown as being provided by a suitable shank 10 which is of sufficient dimensions to be clamped in the tool post of the machine to which it is attached, and to provide rigid support for the inserted cutting element which is hereinafter described. The forward end of the shank is provided with a suitable recess 16 in which a hard seat 12 may be secured by means of a vertical screw (not shown) or by means of brazing or by adhesive. This hard seat may be made of carbide and it is quite customarily used for providing a hard flat surface on which to seat the inserted cutting element 14 so that bottom 38 of insert 14 has a rigid firm foundation.

The inserted cutting element 14 is an insert made of carbide or ceramic and suitably compounded for the cutting of metallic materials. The insert shown has third and fourth sides 46 and 48 which are at an acute angle to each other and at substantially right angles to the top 40 and bottom 38 of the insert 14 to form cutting edges. These inserts are normally very hard and brittle and accordingly must be suitably supported for adequate service. Thus, the insert 14 is located in the recess 16 in the front end of the shank 10. The insert 14 is secured in place in recess 16 by means of a clamp 18 which has a face 20 engaging the first side 42 of the insert 14 and urges the second side 44 of the insert 14 against the side of the recess 16 to hold it in its recess 16 without any endwise or sidewise freedom. The side clamp 18 bears against the shank 10 in its lower area as at 22 and the clamp is urged inwardly by such means as screws 24 and 26 to provide clamping action. The clamp 18 is provided with a tongue 28 which extends into a groove 30 in the shank and the clamp 18 is thus keyed against vertical motion with respect to the shank 10. The clamp 18 abuts against a shoulder 32 on the shank 10 so that rearward motion of the clamp 18 is prevented. The tool holder may be provided with a chip breaker 34, which is shown as being of the one piece type, held down by a screw 36. Alternatively, a chip breaker of carbide can be held on top 40 of the tool insert 14 by means of a suitable clamp similar in form to chipbreaker 34.

It can be seen that this construction permits the insert 14 to be held in place without side or end freedom. With this rigidity there is no motion of the insert 14 with respect to the tool holder. Such motion is often caused by the varying forces on the different areas of the cutting edge occasioned by profile turning as in a tracer lathe. The side clamp 18 is particularly advantageously used on tools intended for profiling work for that reason as well as because this inventive arrangement is capable of adequately supporting an insert having a more acute angled tip than is possible with standard holders. The side clamp is adequate to hold the insert in place during heavy profiling operations, and the top chipbreaker 34 is not necessary for clamping purposes.

The invention has been described in detail with respect to its preferred embodiment, but it can be clearly seen that the invention is capable of numerous modifications. Thus, it is desired that the scope of the invention be defined by the appended claim.

What I claim is:

In a cutting tool, an inserted cutting element having a substantially planar and parallel top and bottom, first and second sides on said cutting element, said first and second sides being substantially planar substantially parallel to each other and substantially at right angles to said top and bottom, third and fourth sides on said cutting element, said third and fourth sides being substantially planar, the planes defined by said third and fourth sides being intersecting with each other and with said first and second sides and being at substantially right angles with said top and bottom; a tool holder for holding said inserted cutting element, said tool holder extending substantially to and being limited by the planes defined by said third and fourth sides on said cutting element, said tool holder having a recess defined by a bottom and a side for accepting said cutting element, said bottom of said cutting element being against said bottom of said recess and said second side of said cutting element being against said side of said recess, walls in said tool holder defining a groove extending generally parallel to said cutting element top and below said recess, said groove extending lengthwise generally parallel to said first side of said cutting element, a clamp engaging said first side of said cutting element and said tool holder urging said second side of said cutting element against said side of said recess, a tongue on said clamp closely fitting within said groove, a second clamp fastened to the top of said tool holder and engaging the top of said cutting element, and both said clamps extending closely to and being limited by the planes defined by said third and fourth sides of said cutting element.

References Cited in the file of this patent
UNITED STATES PATENTS

| | | |
|---|---|---|
| 396,764 | Pipes | Jan. 29, 1889 |
| 629,236 | Carr | July 18, 1899 |
| 716,184 | Breul | Dec. 16, 1902 |

(Other references on following page)

UNITED STATES PATENTS

| | | |
|---|---|---|
| 1,025,017 | Patnaude | Apr. 30, 1912 |
| 1,351,467 | Chapin | Aug. 31, 1920 |
| 1,355,698 | Rouillard | Oct. 12, 1920 |
| 1,395,262 | Curtin | Nov. 1, 1921 |
| 1,397,357 | Bronander | Nov. 15, 1921 |
| 1,456,552 | Henning | May 29, 1923 |
| 2,078,820 | Vrehweger | Apr. 27, 1937 |
| 2,183,796 | Saffady | Dec. 19, 1939 |
| 2,577,043 | Steffes | Dec. 4, 1951 |
| 2,697,866 | Greenleaf | Dec. 28, 1954 |
| 2,716,799 | Bader | Sept. 6, 1955 |
| 2,805,467 | Greenleaf | Sept. 10, 1957 |
| 2,848,789 | Friedline | Aug. 26, 1958 |
| 2,849,787 | Hertel | Sept. 2, 1958 |
| 2,897,580 | Huber | Aug. 4, 1959 |

FOREIGN PATENTS

| | | |
|---|---|---|
| 288,761 | Great Britain | Apr. 19, 1928 |
| 538,764 | Italy | Jan. 30, 1956 |

OTHER REFERENCES

Tool Bits Held Vertically to the Work by Roberts S. Bell from The American Machinist Magazine, page 114. Issue of May 13, 1943.